(12) United States Patent  (10) Patent No.: US 8,466,933 B2
Nishikawa  (45) Date of Patent: Jun. 18, 2013

(54) INFORMATION PROCESSING UNIT HAVING COMMUNICATION FUNCTION

(75) Inventor: Kenji Nishikawa, Hyogo (JP)

(73) Assignee: Panasonic Corporation, Osaka (JP)

( * ) Notice: Subject to any disclaimer, the term of this patent is extended or adjusted under 35 U.S.C. 154(b) by 229 days.

(21) Appl. No.: 13/013,907

(22) Filed: Jan. 26, 2011

(65) Prior Publication Data

US 2011/0199392 A1  Aug. 18, 2011

(30) Foreign Application Priority Data

Feb. 17, 2010  (JP) ................................ 2010-032813

(51) Int. Cl.
*G09G 5/00* (2006.01)
(52) U.S. Cl.
USPC .......... 345/619; 345/649; 345/650; 345/654; 345/657; 345/658; 345/659
(58) Field of Classification Search
None
See application file for complete search history.

(56) References Cited

U.S. PATENT DOCUMENTS

| | | | |
|---|---|---|---|
| 2007/0037619 A1* | 2/2007 | Matsunaga et al. | ........ 455/575.7 |
| 2007/0200775 A1 | 8/2007 | Hirota | |
| 2008/0085736 A1 | 4/2008 | Kitamura et al. | |
| 2010/0214319 A1* | 8/2010 | Nakano | ........................ 345/652 |

FOREIGN PATENT DOCUMENTS

| | | |
|---|---|---|
| JP | 2004-015263 | 1/2004 |
| JP | 2006-340180 | 12/2006 |
| JP | 2007-235329 | 9/2007 |
| JP | 2008-090345 | 4/2008 |
| JP | 2008-118625 | 5/2008 |

* cited by examiner

*Primary Examiner* — Kee M Tung
*Assistant Examiner* — Jwalant Amin
(74) *Attorney, Agent, or Firm* — Hamre, Schumann, Mueller & Larson, P.C.

(57) ABSTRACT

An information processing unit is configured so that in a case where a display-rotating button 4 or 11*b* is operated by a user so as to select a second display mode, and where either a communication unit 5 or 13 is in an activated state and the user does not halt the action of the communication unit 5 or 13, the display mode is shifted to a mode other than the second display mode. Thereby, it is possible to urge the user to change the posture of a main body 1.

2 Claims, 19 Drawing Sheets

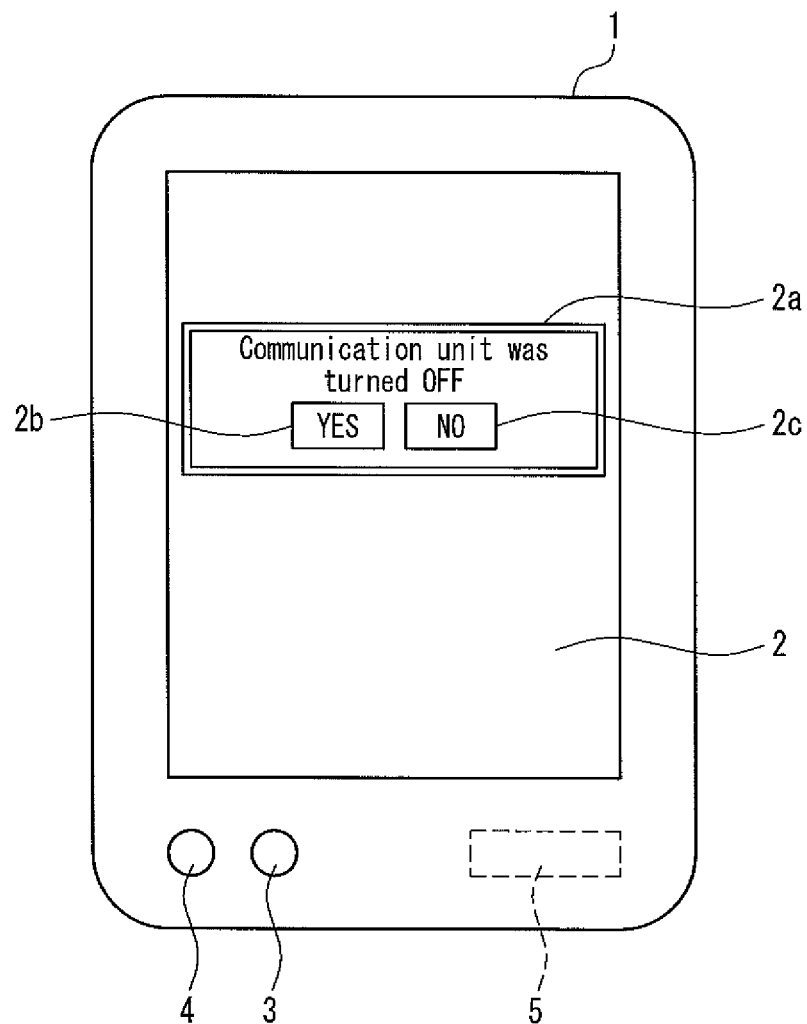
F I G. 7

INFORMATION PROCESSING UNIT HAVING COMMUNICATION FUNCTION

BACKGROUND

1. Field

The present application relates to an information processing unit having a communication function.

2. Description of Related Art

Recent mobile devices such as a notebook type personal computer (hereinafter, abbreviated as notebook PC) often have antennas and transmitting/receiving circuits (hereinafter, referred to as communication units) so that they can be connected in a wireless manner to a network such as LAN (Local Area Network) and WAN (Wide Area Network). The antenna and the transmitting/receiving circuit output a high-level electromagnetic wave at the time of transmitting information to the exterior. It has been known that such a high-level electromagnetic wave may have an adverse effect on a human body. With regard to such an adverse effect on a human body by the electromagnetic wave, the Japanese Ministry of Internal Affairs and Communications has established guidelines of SAR (Specific Absorption Rate) that expresses the level of energy of electromagnetic wave absorbed by a human body. Manufacturers of mobile equipment are required to design and manufacture equipment that satisfies the guidelines of SAR.

JP 2006-340180 A discloses a configuration of mobile equipment having a communication unit, for detecting the use condition (setting condition) of a mobile terminal, determining an antenna whose use should be stopped among a plurality of antennas, and stopping use of the antenna.

However, the configuration disclosed in JP 2006-340180 A is required to have a plurality of antennas having a capability of transmitting information to the exterior. This configuration inevitably increases the cost and hinders miniaturization of the equipment.

SUMMARY

Therefore, with the foregoing in mind, it is an object of the present application to provide an information processing unit that includes: an operation unit that accepts an operation by a user; a communication unit that has a capability of wireless information communications; a display unit that has a capability of displaying an image; and a control unit that controls actions of the communication unit and the display unit on the basis of operation contents accepted by the operation unit. In the information processing unit, the operation unit has a capability of an operation for changing an orientation of an image displayed on the display unit, and the control unit is capable of changing the orientation of the image displayed on the display unit on the basis of the operation contents accepted by the operation unit, and when the orientation of the image is changed so that the lower side of the image is located close to the communication unit, the control unit allows the display unit to display a message.

(Action example 1)

FIG. 7 is a schematic view showing an example of a warning message display.

Figure 8:
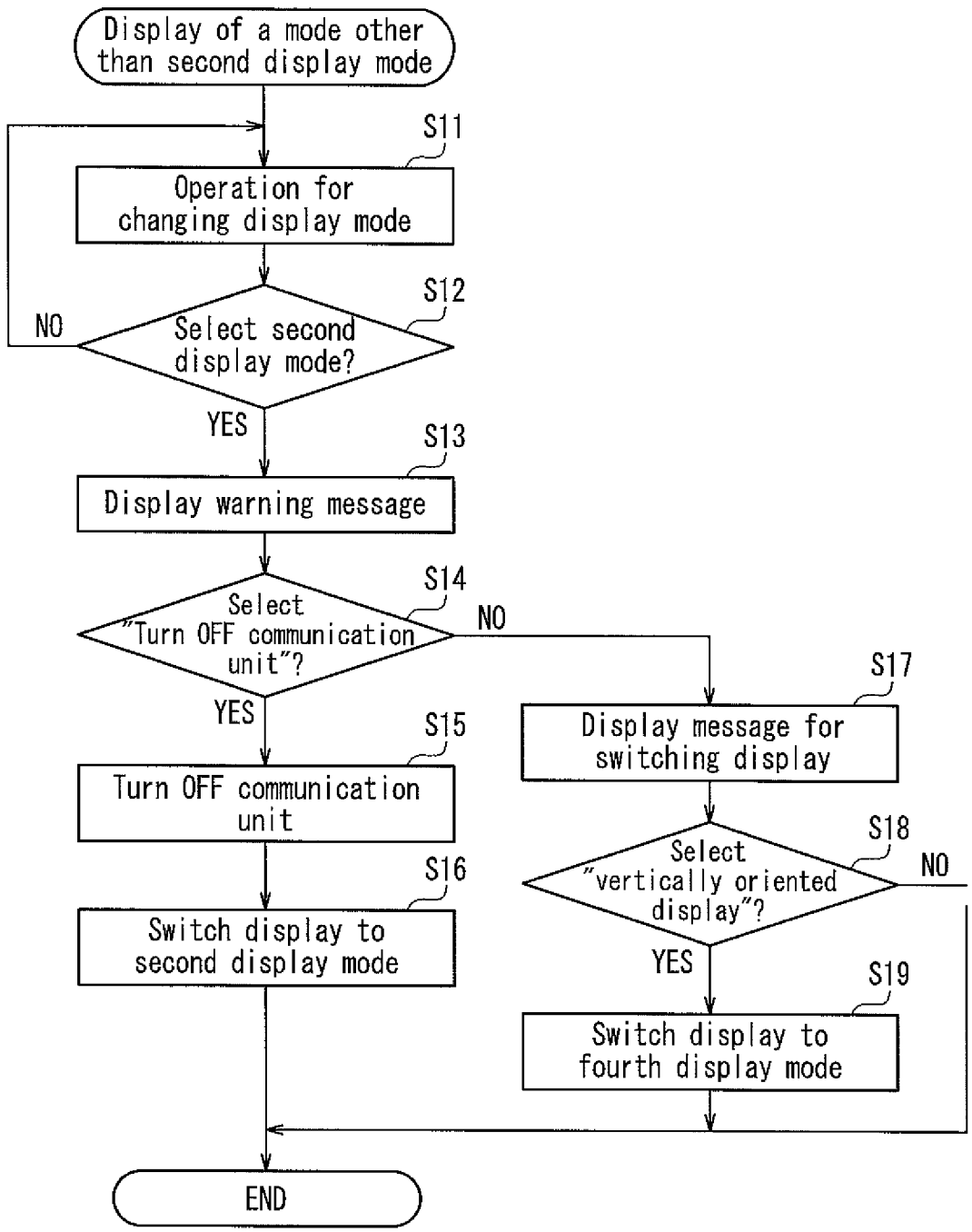

FIG. 8 is a flow chart showing a flow of actions of a control unit.

(Action Example 2)

Figure 9A:
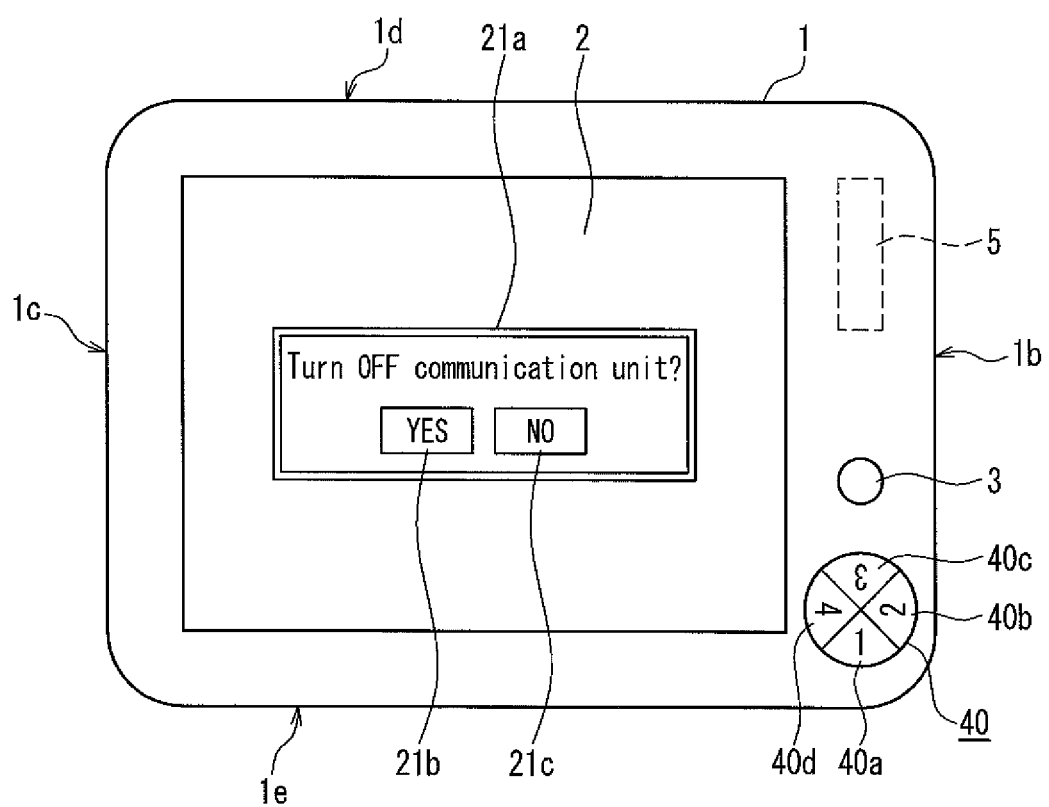

FIG. 9A is a schematic view showing an example of a warning message display.

Figure 9B:
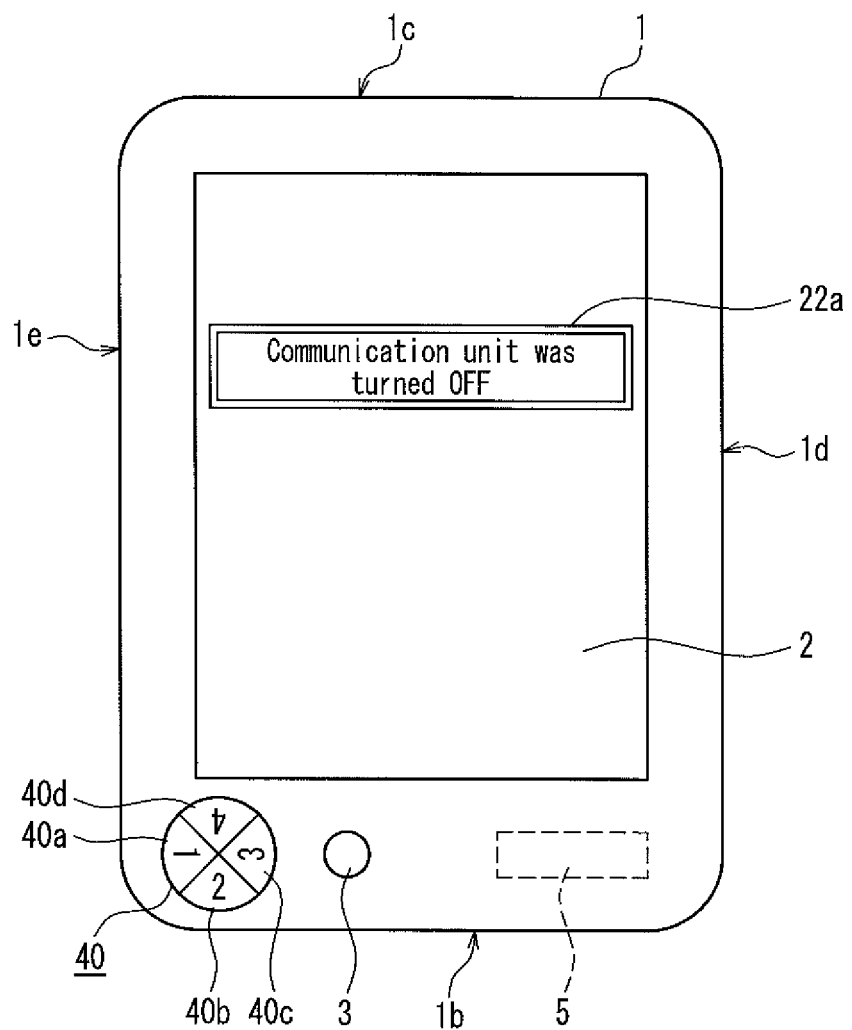

FIG. 9B is a schematic view showing an example of a warning message display.

Figure 9C:
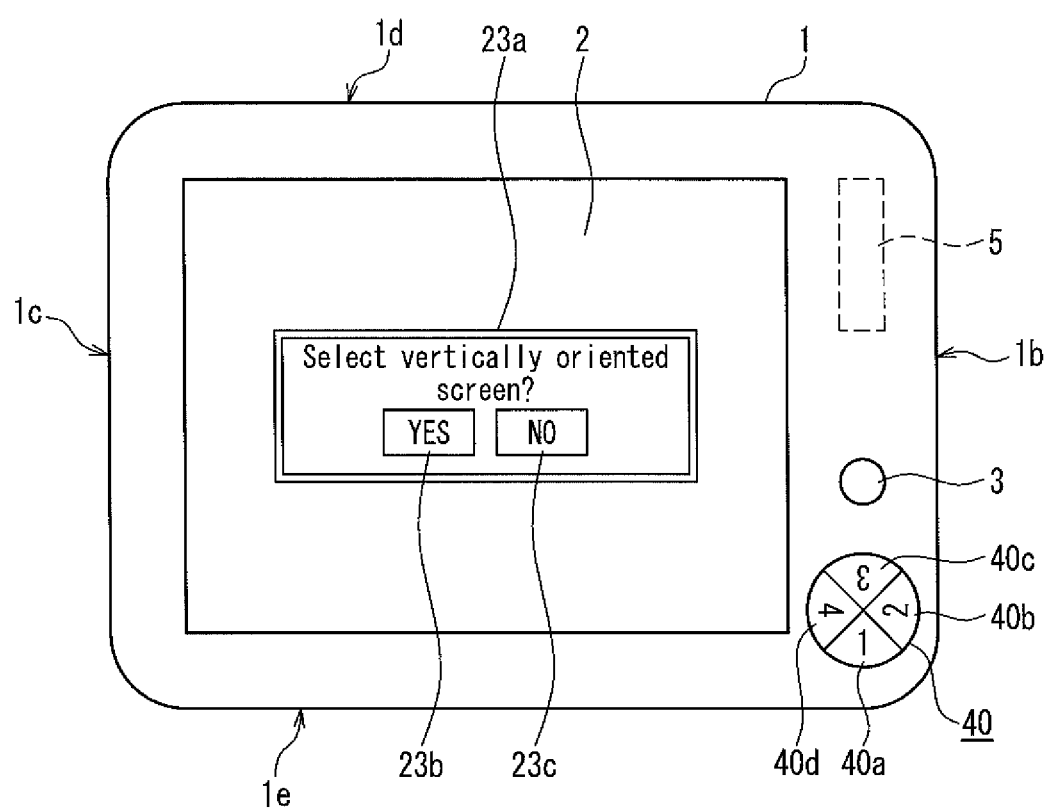

FIG. 9C is a schematic view showing an example of a warning message display.

Figure 9D:
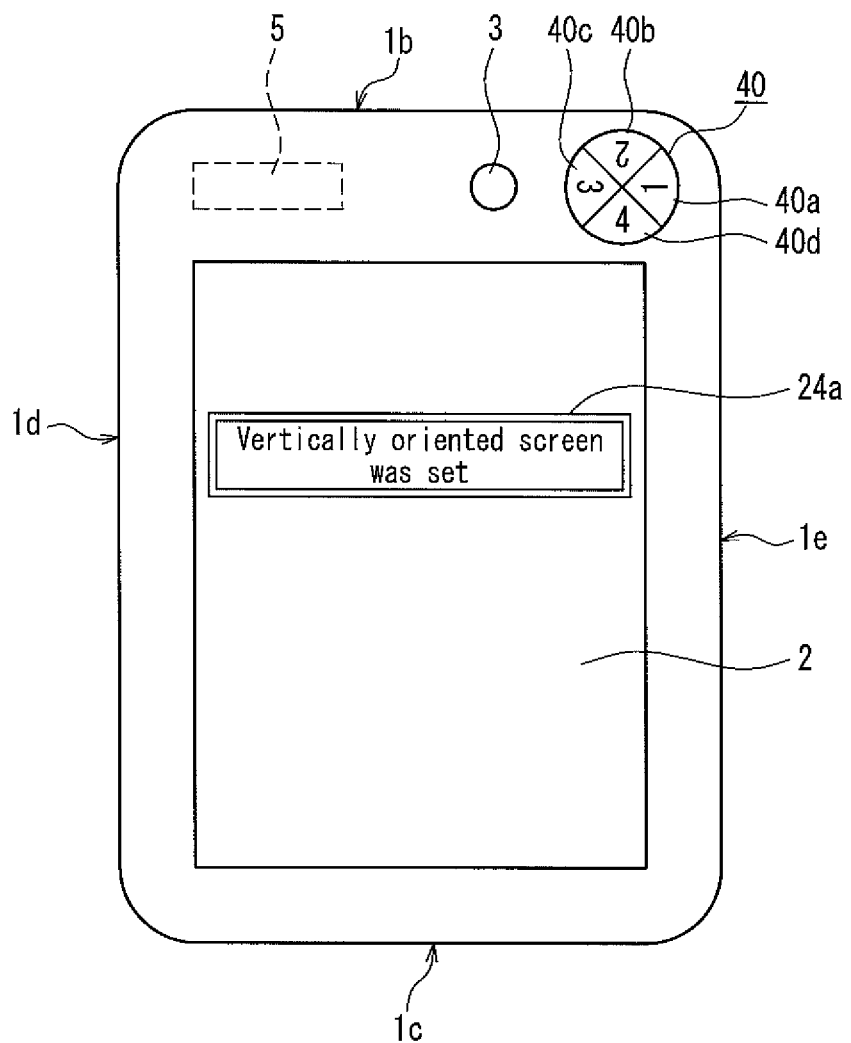

FIG. 9D is a schematic view showing an example of a warning message display.

Figure 10:
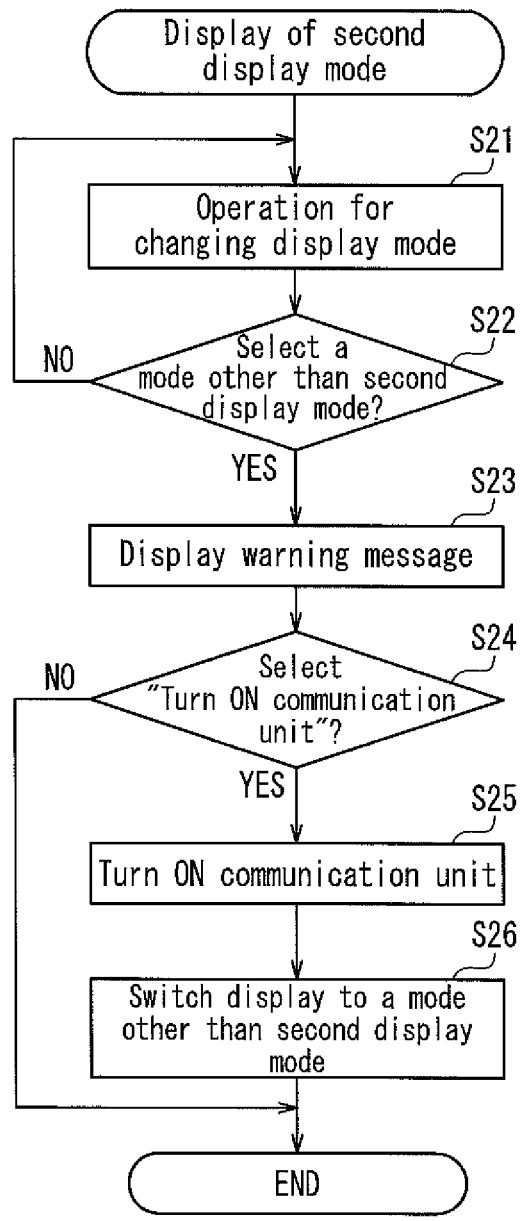

FIG. 10 is a flow chart showing a flow of actions of a control unit.

(Action Example 2)

Figure 11A:
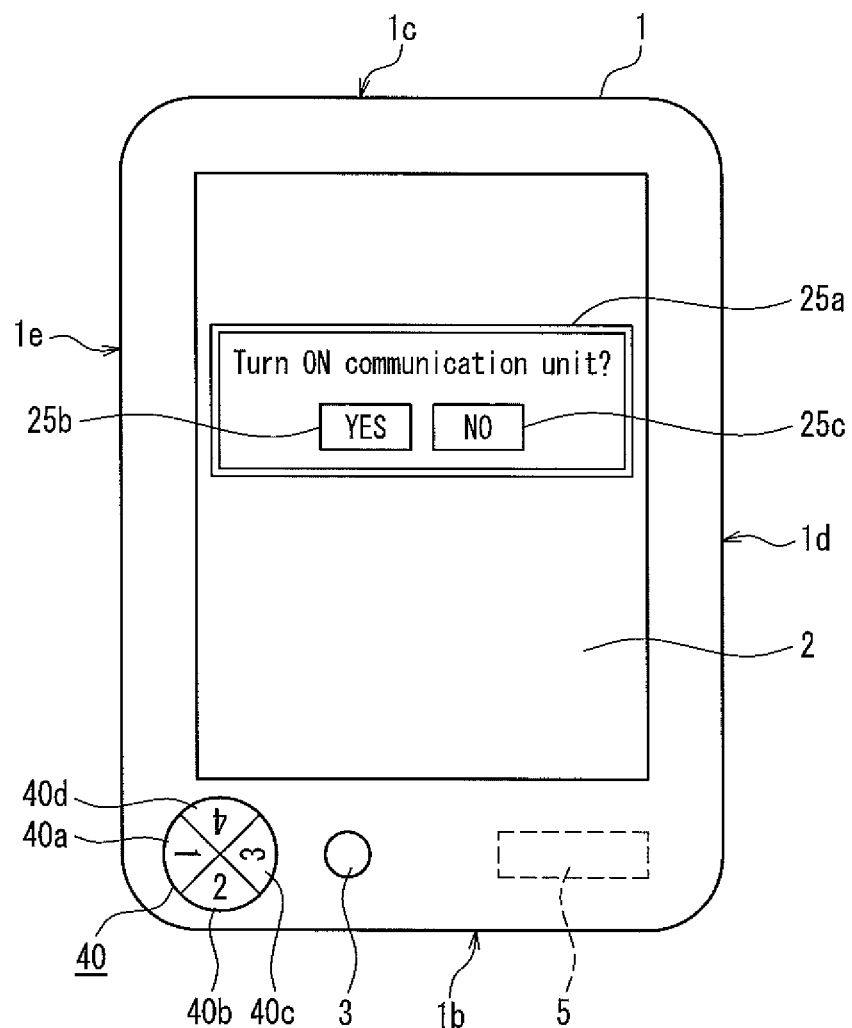

FIG. 11A is a schematic view showing an example of a warning message display.

Figure 11B:
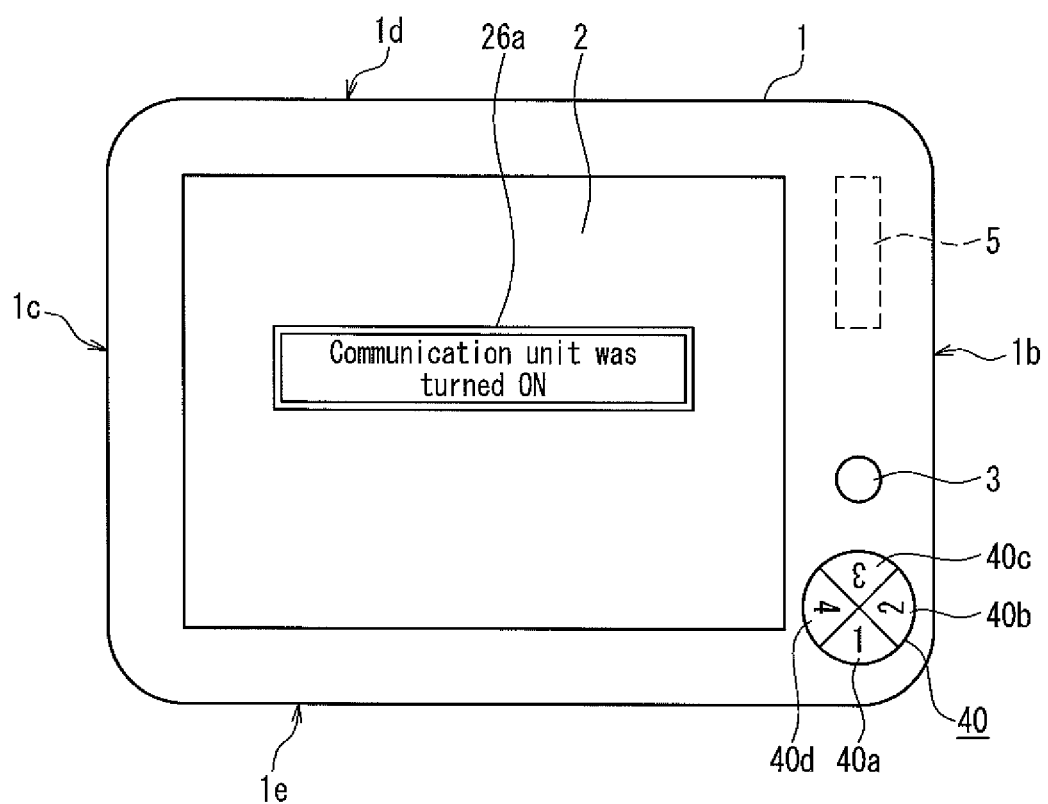

FIG. 11B is a schematic view showing an example of a warning message display.

Figure 12:
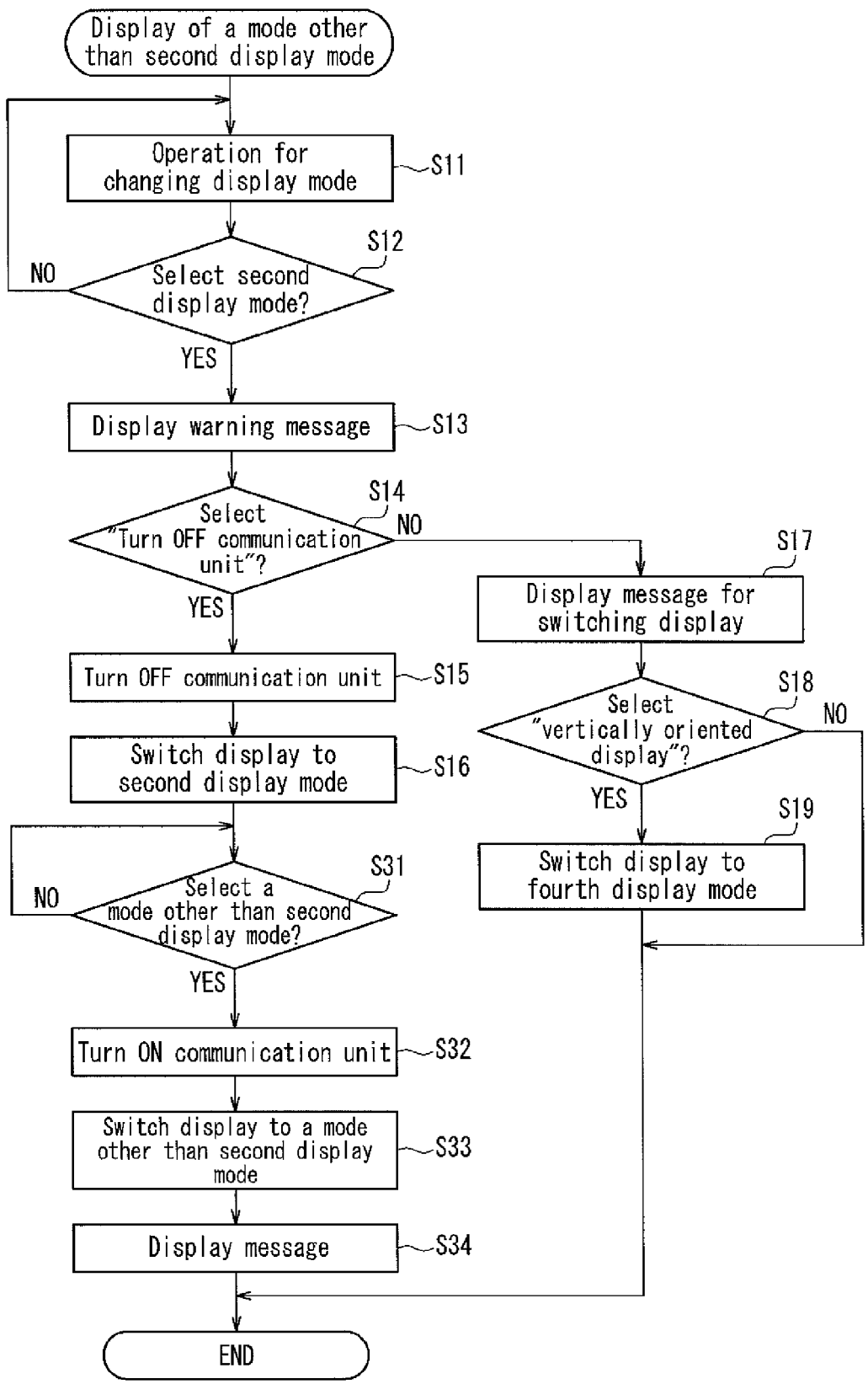

FIG. 12 is a flow chart showing a flow of actions of a control unit.

(Action Example 3)

Figure 13A:
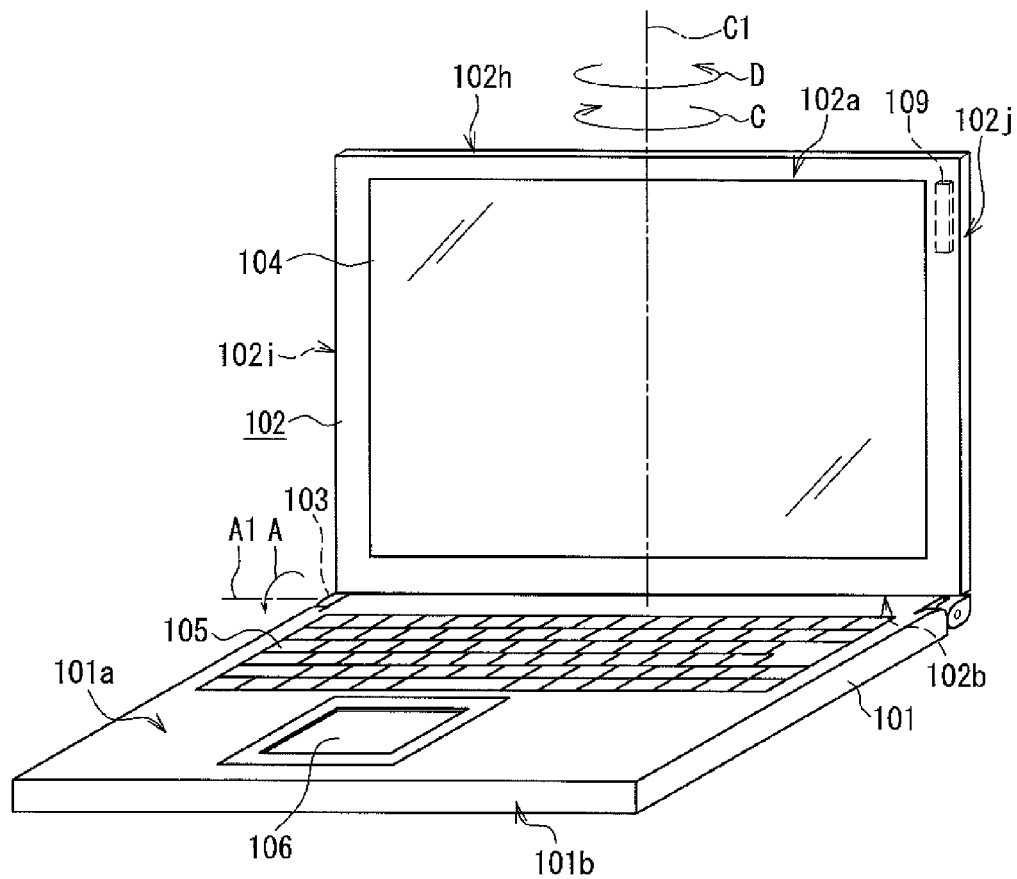

FIG. 13A is a perspective view showing a notebook PC according to the embodiment (first state).

Figure 13B:
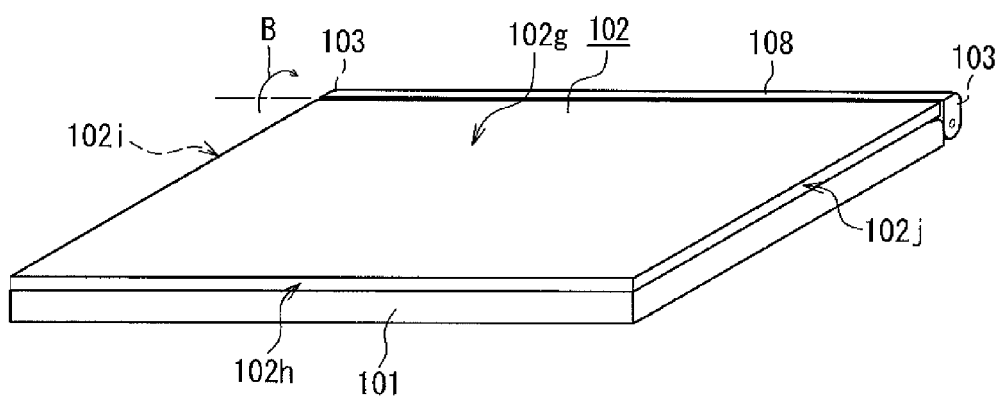

FIG. 13B is a perspective view showing a notebook PC according to the embodiment (second state).

Figure 13C:
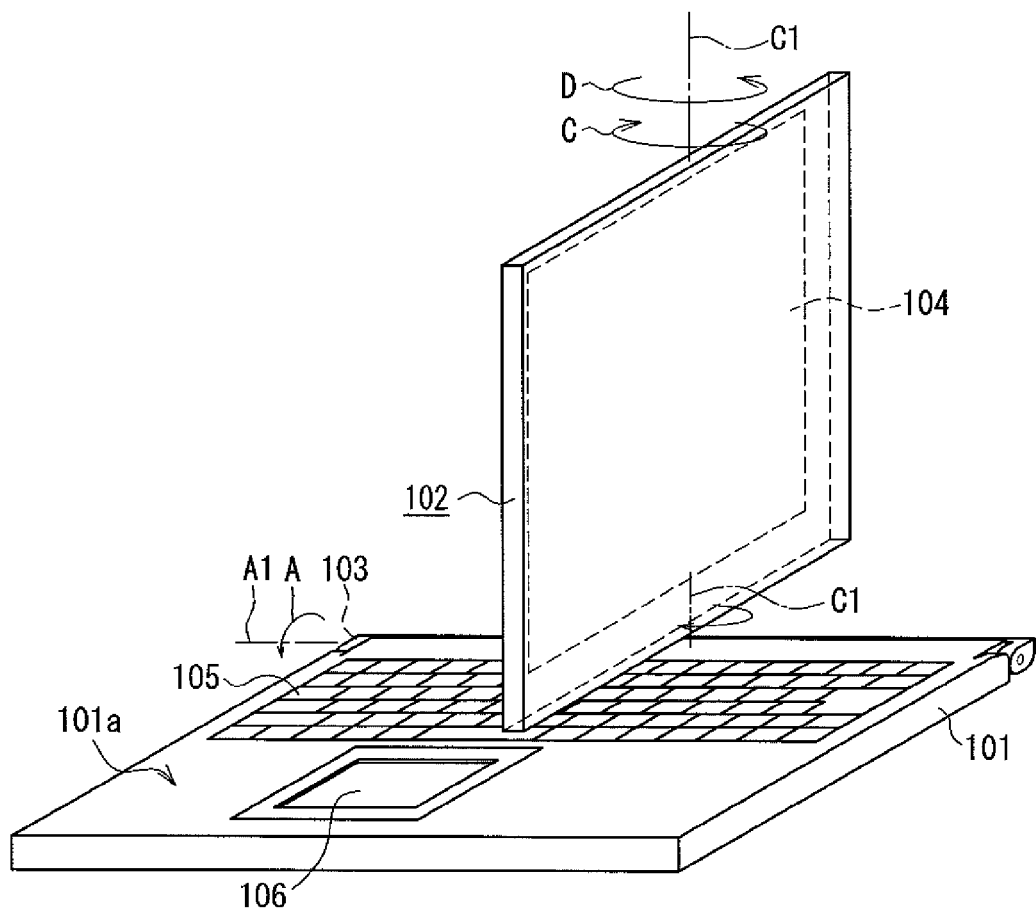

FIG. 13C is a perspective view showing a notebook PC according to the embodiment (third state).

Figure 13D:
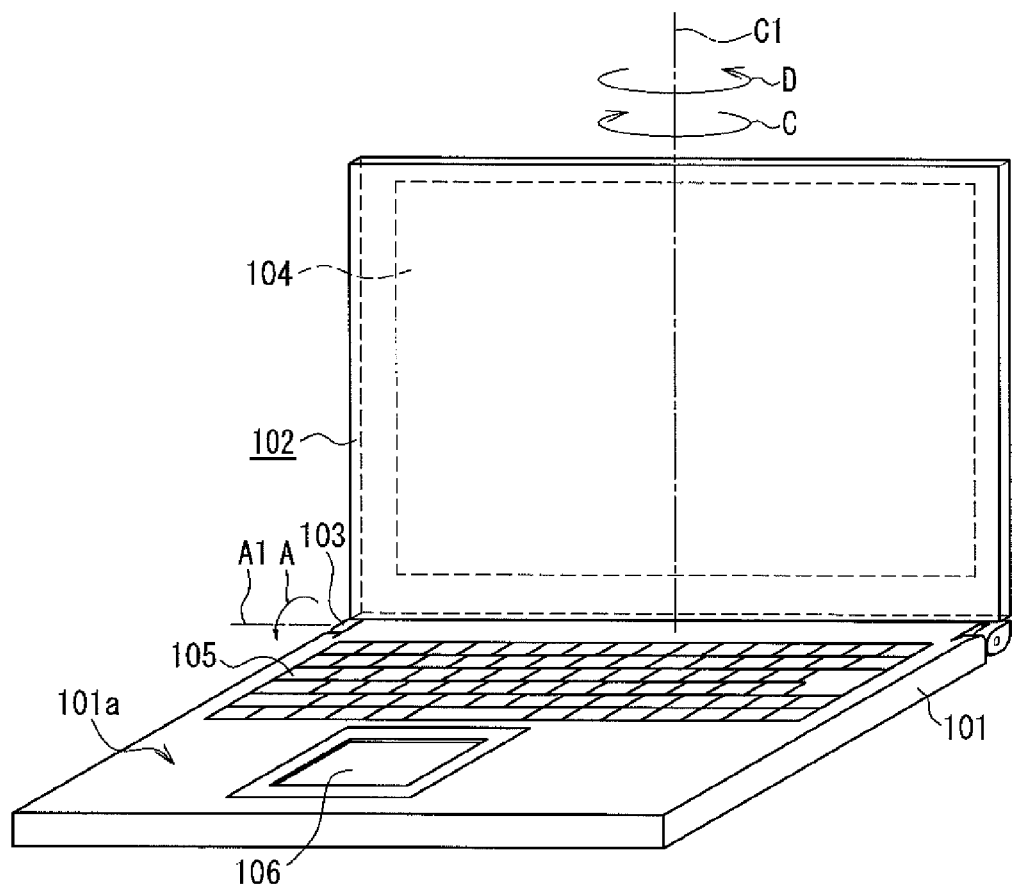

FIG. 13D is a perspective view showing a notebook PC according to the embodiment (fourth state).

Figure 13E:
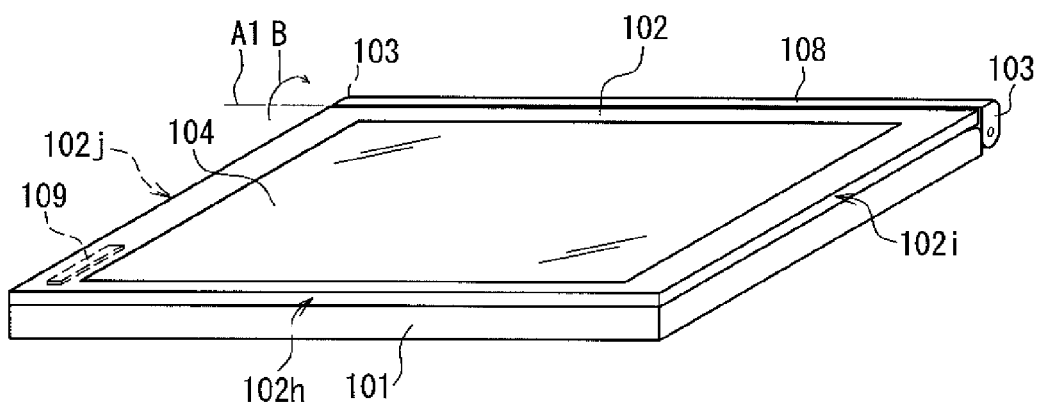

FIG. 13E is a perspective view showing a notebook PC according to the embodiment (fifth state).

DETAILED DESCRIPTION OF THE EMBODIMENTS (Embodiment)

[1. Structure of Information Processing Unit]

Hereinafter, as an example of an information processing unit of the present application, a tablet type PC having a communication function will be described. The information processing unit is not limited particularly as long as it is mobile equipment having at least a communication function, and the examples thereof include a notebook PC, a mobile phone terminal, PDA (Personal Digital Assistant) and a portable game machine as well as the tablet type PC.

Figure 1:
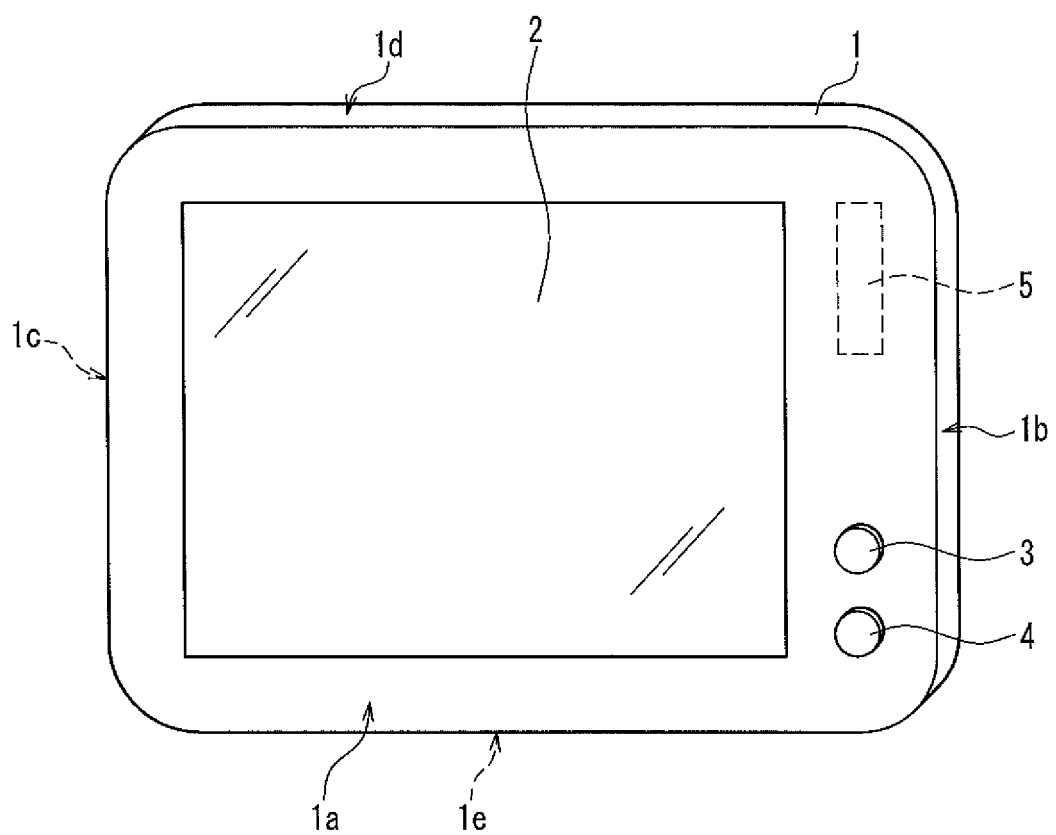
FIG. 1 is a perspective view showing a tablet type PC according to an embodiment.

FIG. 1 is a perspective view showing a tablet type PC according to the present embodiment. In FIG. 1, the tablet type PC includes a main body 1, a display panel 2, a power-supply button 3, a display-rotating button 4, and a communication unit 5.

The main body 1 is configured by integrating a central processing unit (CPU), a memory, an electric circuit board and the like in a substantially rectangular cabinet. The main body 1 has a front face 1a on which the display panel 2, the power-supply button 3 and the display-rotating button 4 are arranged. Side faces 1b, 1c, 1d and 1e are placed next to each other and adjacent to the front face 1a. The side face 1b and the side face 1c oppose each other. The side face 1d and the side face 1e oppose each other.

The display panel 2 is capable of displaying images or the like generated at a signal processing circuit inside the main body 1. The display panel 2 includes a touch panel that can be operated arbitrarily by contacting a stylus pen or the like with the display area. The display panel 2 is arranged on the front face 1a of the main body 1. The display area of the display panel 2 is shaped rectangular with an aspect ratio of 4:3 for example. Alternatively, the aspect ratio of the display area of the display panel 2 may be 16:9.

By press-operating the power-supply button 3, the power supply of the main body 1 can be transited from an OFF state to an ON state, and also from an ON state to an OFF state. The power-supply button 3 is not limited to the button type operation component, but also it can be a slide type, a lever type or the like.

By press-operating the display-rotating button 4, the image displayed on the display panel 2 can be rotated in a predetermined direction. The display-rotating button 4 is not limited to the button type operation component, but it can be a slide type, a lever type or the like.

The communication unit 5 can be connected to a predetermined network through wireless communications. The communication unit 5 can be configured to include an antenna, a transmitting circuit and a receiving circuit. Though the communication unit 5 can be connected to a network confirming standards of LAN, WAN, WiMAX (Worldwide Interoperability for Microware Access) and a network confirming the Bluetooth (registered trademark) standards, in the present embodiment it is provided as a communication unit corresponding to WAN having a relatively high output level. The communication unit 5 is arranged in the vicinity of the side face 1b in the main body 1.

Figure 2:
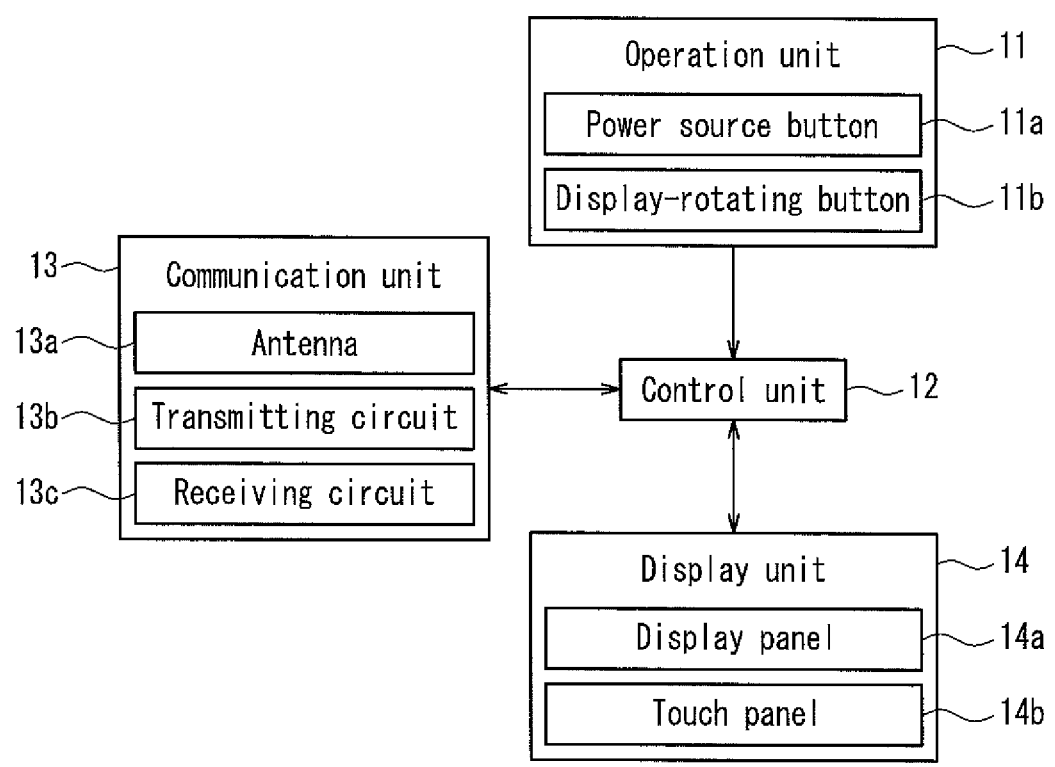
FIG. 2 is a block diagram showing a system structure of a tablet type PC.

FIG. 2 is a block diagram showing an internal structure of a tablet type PC. As shown in FIG. 2, the tablet type PC includes an operation unit 11, a control unit 12, a communication unit 13, and a display unit 14. The configuration of the communication unit 13 is the same as that of the communication unit 5.

The operation unit 11 includes a power-supply button 11a and a display-rotating button 11b. The operation unit 11 may include other operation components not explained in the present embodiment. The power-supply button 11a corresponds to the power-supply button 3 as shown in FIG. 1, and it can conduct an operation of switching ON or OFF the power supply of the tablet type PC. The display-rotating button 11b corresponds to the display-rotating button 4 as shown in FIG. 1, and it can conduct an operation of changing the orientation of characters and images displayed on a display panel 14a (display panel 2 as shown in FIG. 1).

The control unit 12 controls the communication unit 13 and the display unit 14 on the basis of a control signal sent from the operation unit 11.

The communication unit 13 is capable of transmitting/receiving a radio signal. The communication unit 13 includes for example an antenna 13a, a transmitting circuit 13b, and a receiving circuit 13c. The transmitting circuit 13b is capable of sending a transmission signal sent from the control unit 12 to the antenna 13a so as to transmit the signal to the exterior. The receiving circuit 13c extracts only a desired signal from among the signals received at the antenna 13a, and sends the signal to the control unit 12. The transmitting circuit 13b and the receiving circuit 13c can be provided for example as bandpass filters. In the present embodiment, the communication unit 13 has a function of transmitting and receiving a radio signal. In fact, however, the communication unit 13 is required at least to have a function of transmission.

The display unit 14 corresponds to the display panel 2 as shown in FIG. 1. The display unit 14 includes a display panel 14a and a touch panel 14b. The display panel 14a is capable of displaying a character and an image due to a control by the control unit 12. The display panel 14a can be provided for example as a liquid crystal display panel or an organic EL display panel. The touch panel 14b detects a pressure applied by a stylus pen 6 (described later) or the like, and sends the detected signal to the control unit 12. Specifically, the touch panel 14b is configured to include a plurality of membrane switches disposed in a matrix for example. By pressing an arbitrary position with the stylus pen 6 or the like, a membrane switch arranged at the position is turned on, and the detected signal is outputted to the control unit 12.

Figure 3:
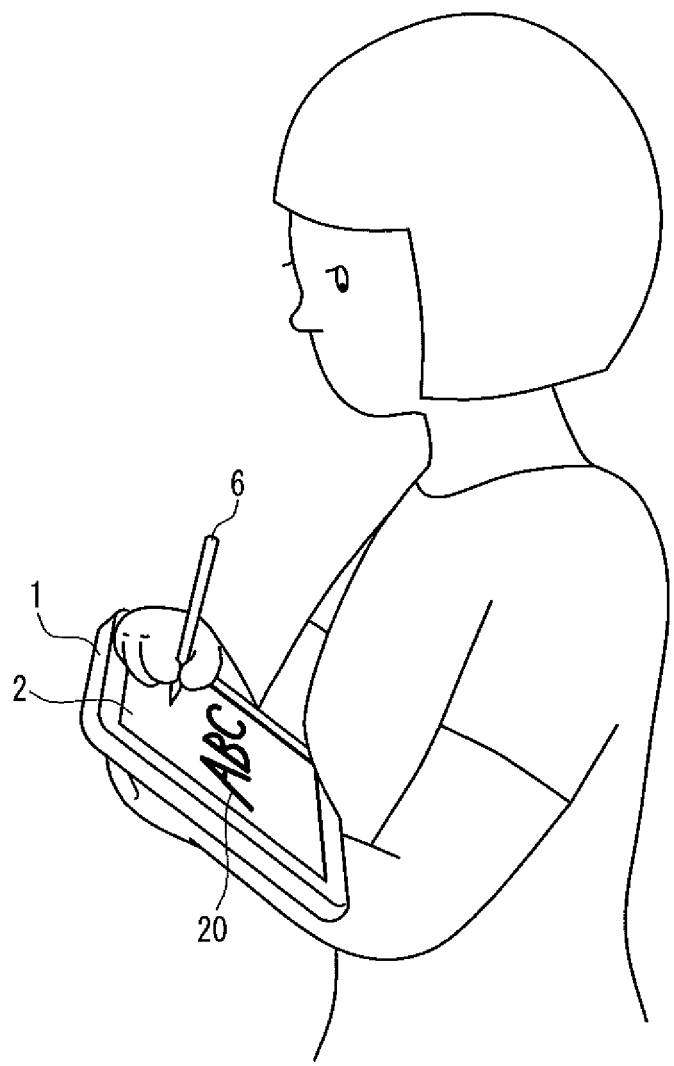
FIG. 3 is a perspective view showing a state of holding a tablet type PC.

FIG. 3 shows a state in which a user operates the tablet type PC as shown in FIG. 1. During an operation of the tablet type PC, for example, the user holds the main body 1 with the left hand and holds the stylus pen 6 with the right hand as shown in FIG. 3. By contacting the stylus pen 6 with an arbitrary position in the display area of the display panel 2, a control signal is sent to the control unit 12 (see FIG. 2) from the touch panel 14b (see FIG. 2) corresponding to the position. Based on the detected signal, the control unit 12 (see FIG. 2) controls the respective components inside the main body 1 or the controls contents to be displayed on the display panel 14a (see FIG. 2). Thereby, the user can conduct an arbitrary operation.

Figure 4:
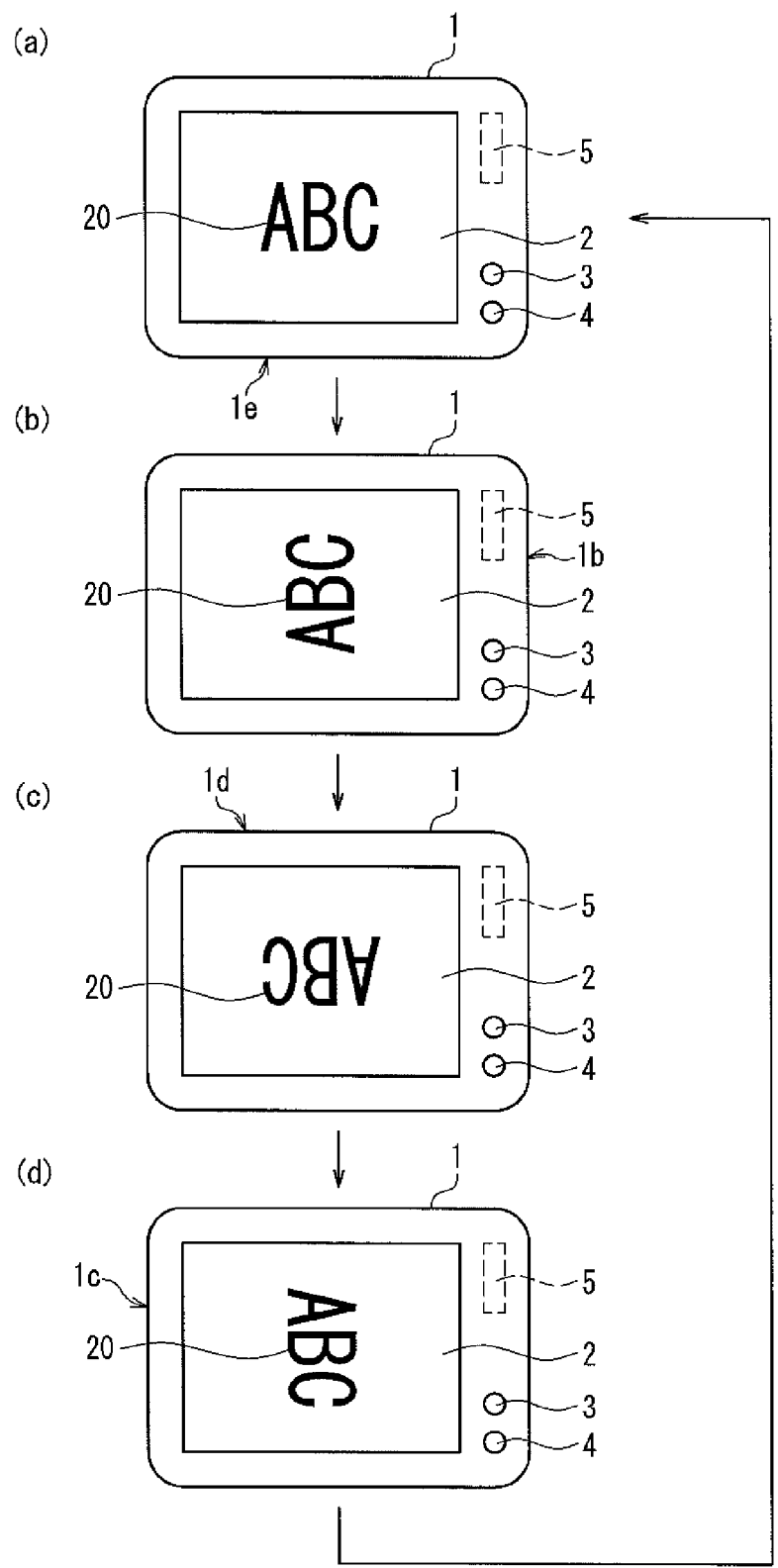
FIG. 4 is a schematic view showing a transition at a time of rotating an image displayed on a display panel.

FIG. 4 shows a transition of the display mode of the display panel 2 during an operation of the display-rotating button 4. A state (a) in FIG. 4 shows a display mode where the lower side of an image 20 displayed on the display panel 2 is oriented to the side face 1e (first display mode). A state (b) in FIG. 4 shows a display mode where the lower side of the image 20 displayed on the display panel 2 is oriented to the side face 1b (second display mode). A state (c) in FIG. 4 shows a display mode where the lower side of the image 20 displayed on the display panel 2 is oriented to the side face 1d (third display mode). And a state (d) in FIG. 4 shows a display mode where the lower side of the image 20 displayed on the display panel 2 is oriented to the side face 1c (fourth display mode).

When the display mode of the display panel 2 is for example in the first display mode of the state (a) as shown in FIG. 4, by pressing the display-rotating button 4 as shown in FIG. 1 once, the display mode is switched to the second display mode of the state (b) as shown in FIG. 4. Subsequently, every pressing of the display-rotating button 4 switches the display mode to the third display mode of the state (c) as shown in FIG. 4, the display mode of the state (d) as shown in FIG. 4 and the display mode of the state (a) as shown in FIG. 4 sequentially. By operating the display-rotating button 4, the user can select an arbitrary display mode among the display modes of the states (a) to (d) as shown in FIG. 4. Therefore, for example, in a case of using the display panel 2 with its long sides being horizontal as viewed by the user, the user operates the display-rotating button 4 so as to obtain the display mode of the state (a) or (c) as shown in FIG. 4. In a case of using the display panel 2 with its short sides being horizontal as viewed by the user, the user operates the display-rotating button 4 so as to obtain the display mode of the state (b) or (d) as shown in FIG. 4.

It should be noted that the ascending transition order as shown in FIG. 4 is just an example. Alternatively, the transition may be in a descending order so that the display mode is switched in an order starting from the fourth display mode and followed by the third display mode, the second display mode and the first display mode every time the display-rotating button 4 is operated.

In a case where the display rotating button 4 is a two-contacts system such as a slide type and lever type, the display mode can be transitioned selectively in either the ascending order or the descending order.

Figure 5:
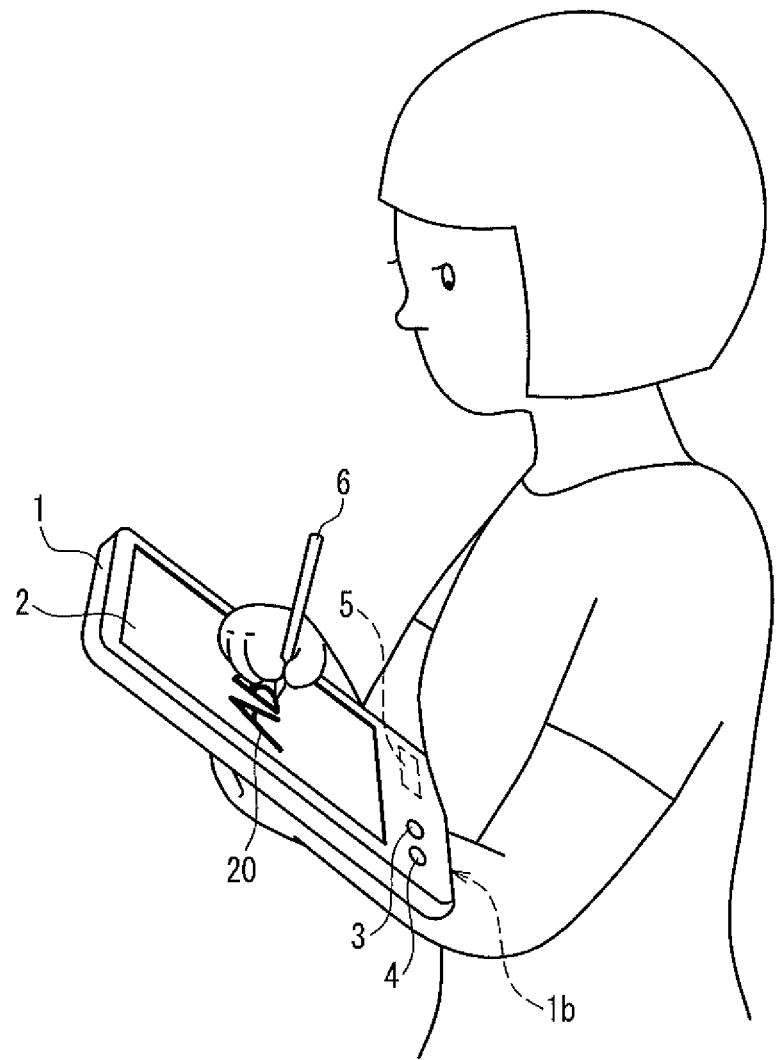
FIG. 5 is a perspective view showing a state of holding a tablet type PC.

FIG. 5 shows a state in which a user holds a tablet type PC with its side face 1*b* of the main body 1 being oriented to the user himself. When the user holds the tablet type PC at a posture as shown in FIG. 2, he often sets the display mode of the display panel 2 to the second display mode of the state (b) as shown in FIG. 4 in order to observe easily the image 20 displayed on the display panel 2. In the description, the pronoun "he" or "himself" is used for indicating the user irrespective of the gender.

When the user holds the tablet type PC with its side face 1*b* of the main body 1 being oriented to the user himself as shown in FIG. 5, the communications portion 5 is located close to the user. At this time, if the communication unit 5 is actuated to transmit a radio signal to the exterior, a high-level electromagnetic wave will be emitted from the communication unit 5. Since the high-level electromagnetic wave can cause adverse effects on the user's health, it cannot be recommended to use the tablet type PC in the posture as shown in FIG. 5. A main characteristic of the present embodiment is to urge the user not to use the tablet type PC at the posture as shown in FIG. 5 when the user is going to use the tablet type PC in such a manner. The characteristic of the present embodiment will be described below with reference to FIG. 2 and FIG. 6.

[2. Action of Information Processing Unit]

[2-1. Action Example 1]

Figure 6:
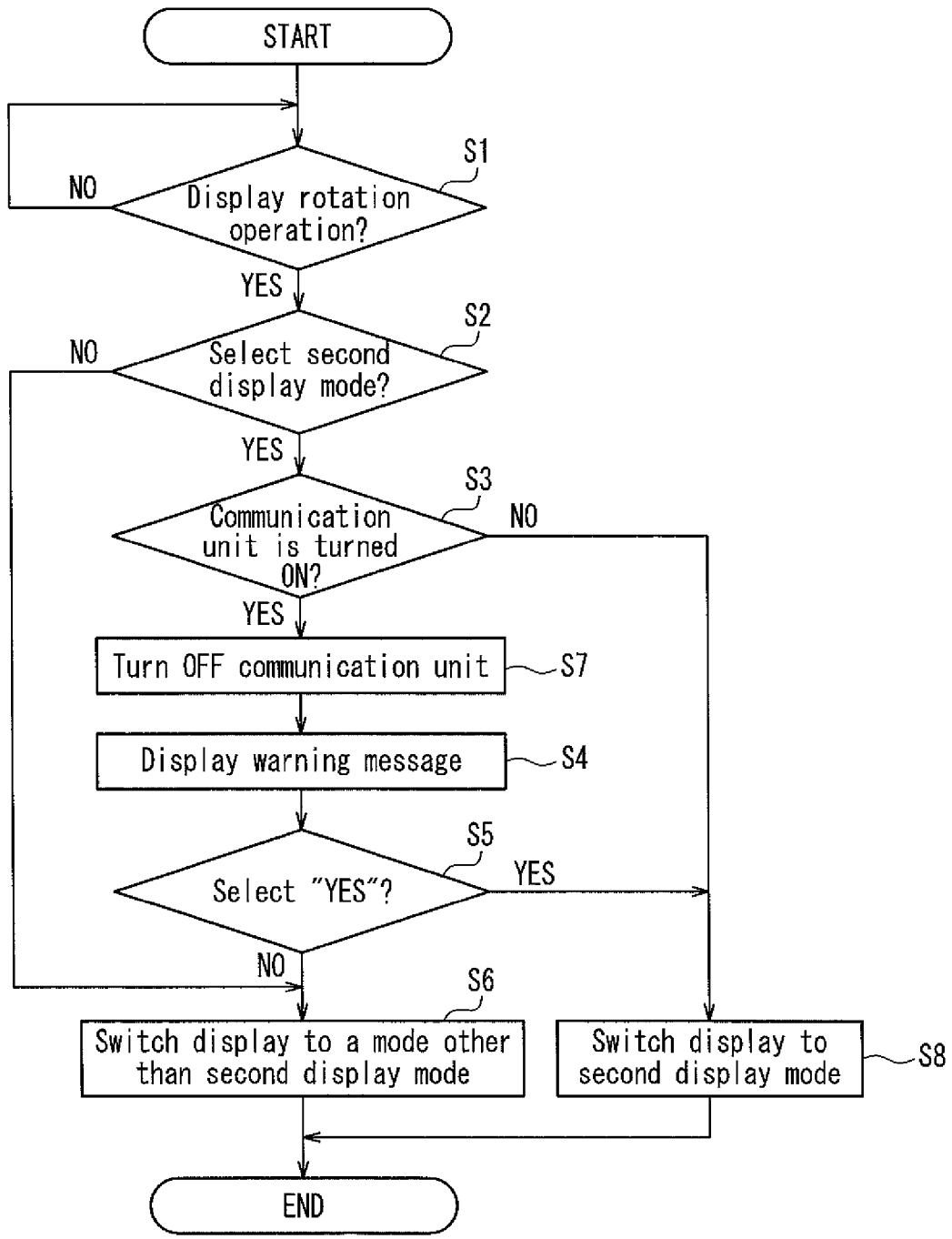
FIG. 6 is a flow chart showing a flow of actions of a control unit.

FIG. 6 shows an action flow of the control unit 12 at the time the user operates the display-rotating button 11*b*. First, when the display-rotating button 11*b* accepts an operation by the user (YES decision at S1), the control unit 12 rotates the image displayed on the display panel 14*a* in a predetermined direction, and sends an image signal of the thus generated image to the display panel 14*a*. The display panel 14*a* displays the image on the basis of the image signal sent from the control unit 12.

Next, the control unit 12 decides which of the first display mode, the second display mode, the third display mode and the fourth display mode the rotated image becomes. The decision is made, for example, by counting the number of operations of the display-rotating button 11*b*, starting from the initial display mode (for example, the first display mode), so that the display mode of the rotated image can be recognized (S2).

When deciding that the rotated image is any one of the first display mode, the third display mode and the fourth display mode (NO decision at S2), the control unit 12 displays the image on the display panel 14*a* on the basis of the selected display mode.

When deciding that the rotated image is the second display mode (YES decision at S2), the control unit 12 decides whether the communication unit 13 has been activated or not (S3). Irrespective of the decision whether the communication unit 13 has been activated or not, the decision result at S3 can be regarded as "NO" in a case where the transmitting circuit 13*b* does not transmit a radio signal even if the communication unit 13 has been activated. Namely, when a high-level electromagnetic wave is not emitted from the communication unit 13, the decision result at S3 can be regarded as "NO".

When deciding that the communication unit 13 has been activated (YES decision at S3), the control unit 12 halts the action of the communication unit 13 (S7). Thereby, emission of the electromagnetic wave is halted. Next, the control unit 12 controls the display panel 14*a* to display a warning message (S4). FIG. 7 shows a state where a warning message 2*a* is displayed on the display panel 2 (display panel 14*a* in FIG. 2). The warning message 2*a* is displayed with a YES button 2*b* and a NO button 2*c*. The user touches a display area of either the YES button 2*b* or the NO button 2*c* displayed on the display panel 2 with the stylus pen 6 (see FIG. 5), so that he can input a reply to the content of the warning message 2*a*.

When the user touches the YES button 2*b* displayed on the display panel 2 with the stylus pen 6 (see FIG. 5) (YES decision at S5), the touch panel 14*b* sends a detected signal to the control unit 12. On the basis of the detected signal, the control unit 12 controls the display panel 14*a* to continuously display the image of the second display mode (S8).

On the other hand, when the user touches the NO button 2*c* displayed on the display panel 2 with the stylus pen 6 (see FIG. 5) (NO decision at S5), the touch panel 14*b* sends a detected signal to the control unit 12. On the basis of the detected signal, the control unit 12 controls the display panel 14*a* to display an image of any display mode selected form the first display mode, the third display mode, and the fourth display mode (S6). In the present embodiment, the display mode of the image to be displayed on the display panel 14*a* is set to the third display mode as the display mode following the second display mode in the rotation order of the image. Alternatively, it can be the first display mode as the display mode immediately before the second display mode.

When the display mode becomes the third display mode in a state where the main body 1 is held at the posture as shown in FIG. 5, the orientation of the image on the display panel 2 becomes not erect with respect to the user. As a result, the user possibly will change the posture of the main body 1 so as to orient the side face 1*d* to the user himself so that the orientation of the image on the display panel 2 will be erect with respect to the user himself. When the user changes the posture of the main body 1 so that the side face 1*d* is oriented to the user himself, the communication unit 13 is separated from the user, and thus the adverse effect on the user's body by the electromagnetic wave emitted from the communication unit 13 can be decreased.

When the display-rotating button 11*b* is operated again, the flow is resumed from the step S1.

[2-2. Action Example 2]

FIG. 8 shows another action flow of the control unit 12. FIGS. 9A-9D are plan views showing an information processing unit including a control unit for conducting the actions as shown in FIG. 8. The information processing unit as shown in FIGS. 9A-9D includes a display-change operation unit 40 in place of the display-rotating button 4 in the information processing unit as shown in FIG. 1.

The display-change operation unit 40 is composed of a first operating portion 40*a*, a second operating portion 40*b*, a third operating portion 40*c* and a fourth operating portion 40*d*, each of which is a push-button. The orientations of the characters "1", "2", "3" and "4" written on the first operating portion 40*a*, the second operating portion 40*b*, the third operating portion 40*c* and the fourth operating portion 40*d* are the same as the orientations of an image to be displayed on the display panel 2 as a result of operation of the operating portions. Therefore, the user can conduct an operation of setting the orientation of the image to be displayed on the display panel 2 arbitrarily on the basis of the orientations of the characters. For example, when the user operates the first operating portion 40*a*, the information processing unit sets the orientation of the image to the orientation of the state (a)

as shown in FIG. 4. When the user operates the second operating portion 40b, the information processing unit sets the orientation of the image to the orientation of the state (b) as shown in FIG. 4. When the user operates the third operating portion 40c, the information processing unit sets the orientation of the image to the orientation of the state (c) as shown in FIG. 4. And when the user operates the fourth operating portion 40d, the information processing unit sets the orientation of the image to the orientation of the state (d) as shown in FIG. 4.

Actions for a case where the initial display mode has been set to a display mode other than the second display mode will be described below with reference to FIG. 8, in a state in which the communication unit 13 is actuated.

In a state where an image based on any one of the first display mode, the third display mode and the fourth display mode is displayed on the display panel 2, when the user operates the display-change operation unit 40 (S11), the control unit 12 decides whether the second operating portion 40b has been operated or not (S12). If deciding that any of the first operating portion 40a, the third operating portion 40c and the fourth operating portion 40d has been operated, the control unit 12 changes the display mode of the display panel 2 on the basis of the operation contents (the step is not illustrated in FIG. 8).

If deciding that the second operating portion 40b has been operated, the control unit 12 allows the display panel 2 to display a warning message 21a as shown in FIG. 9A (S13). The warning message 21a in FIG. 9A is displayed with a YES button 21b and a NO button 21c. The user touches any one of the YES button 21b and the NO button 21c with the stylus pen 6 (see FIG. 5), so that he can input a reply to the content of the warning message 21a. It should be noted that the display mode at this time is still a display mode other than the second display mode.

When the user touches the YES button 21b with the stylus pen 6 (see FIG. 5) (YES decision at S14), the control unit 12 halts the action of the communication unit 13 (S15). At this time, the display mode is still a display mode other than the second display mode.

Next, the control unit 12 switches the display mode of the display panel 2 to the second display mode (S16).

FIG. 9B shows a display state at the time the display of the display panel 2 has been switched to the second display mode by the control unit 12. As shown in FIG. 9B, when the display of the display panel 2 is switched to the second display mode, the control unit 12 allows the display panel 2 to display a message 22a. The display orientation of the message 22a is erect with respect to the user when the user holds the main body 1 in the posture such that the side face 1b is oriented to the user himself.

On the other hand, when the user touches the NO button 21c displayed on the display panel 2 with the stylus pen 6 (see FIG. 5) in the state where the warning message 21a is displayed as shown in FIG. 9A (NO decision at S14), the control unit 12 allows the display panel 2 to display a display-switching message 23a as shown in FIG. 9C (S17). The display-switching message 23a as shown in FIG. 9C includes a content to make the user select the orientation of the display panel 2, specifically, whether a vertically oriented screen is selected or not. In this context, "vertically oriented screen" indicates the display mode of the state (b) or (d) as shown in FIG. 4.

In the display-switching message 23a as shown in FIG. 9C, when the user touches a YES button 23b with the stylus pen 6 (see FIG. 5) (YES decision at S18), the control unit 12 switches the display mode of the display panel 2 to the fourth display mode (S19).

FIG. 9D shows a state where the display mode of the display panel 2 becomes the fourth display mode. As shown in FIG. 9D, when the YES button 23b displayed on the display panel 2 is touched in a state where the display-switching message 23a is displayed on the display panel 2, the control unit 12 switches the display mode of the display panel 2 to the fourth display mode, and at the same time, allows the display panel 2 to display a message 24a.

In a case where the display of the display panel 2 becomes the fourth display mode as shown in FIG. 9D, the user possibly will hold the main body 1 with the side face 1c being oriented to the user himself so that the image displayed on the display panel 2 will be erect with respect to user himself. In such a case, as the communication unit 5 is arranged in an area located close to the side face 1b, the communication unit 5 will be most separated from the user, and thus it is possible to decrease the adverse effect of the electromagnetic wave on the user.

On the other hand, regarding the display-switching message 23a as shown in FIG. 9C, if the user touches the NO button 23c with the stylus pen 6 (see FIG. 5) (NO decision of S18), the control unit 12 ends the flow without changing the display mode of the display panel 2.

Namely, in the flow as shown in FIG. 8, for the sake of switching the display mode other than the second display mode to the second display mode, the control unit 12 does not switch to the second display mode unless the user halts the action of the communication unit 13. In a case where the user does not halt the action of the communication unit 13, the control unit 12 does not change the display mode or changes the display mode to the fourth display mode.

In a case where the initial display mode is the fourth display mode, steps S17-S19 in FIG. 8 can be omitted since the fourth display mode corresponds to a vertically oriented screen.

Actions while the initial display mode is set to the second display mode will be described below with reference to FIG. 10, in the state in which the communication unit 13 has halted its actions.

In a state where an image based on the second display mode is displayed on the display panel 2, when the user operates the display-change operation unit 40 (S21), the control unit 12 decides whether any of the first operating portion 40a, the third operating portion 40c and the fourth operating portion 40d has been operated (S22).

If deciding that an operating portion other than the second operating portion 40b has been operated, the control unit 12 allows the display panel 2 to display a warning message 25a as shown in FIG. 11A (S23). The warning message 25a as shown in FIG. 11A includes a YES button 25b and a NO button 25c. The user touches any one of the YES button 25b and the NO button 25c with the stylus pen 6 (see FIG. 5), so that he can input a reply to the content of the warning message 25a.

When the user touches the YES button 25b displayed on the display panel 2 with the stylus pen 6 (see FIG. 5) (YES decision at S24), the control unit 12 starts the action of the communication unit 13 (S15).

Next, the control unit 12 switches the display mode of the display panel 2 to a display mode other than the second display mode (S26). For example, in a case where the user operates the first operating portion 40a, the control unit 12 switches the display mode to the first display mode of the state (a) as shown in FIG. 4.

FIG. 11B shows a display state where the display of the display panel 2 has been switched to the first display mode by the control unit 12. As shown in FIG. 11B, the control unit 12 switches the display of the display panel 2 to the first display mode and at the same time, allows the display panel 2 to display a message 26a. The display orientation of the message 26a is erect with respect to the user when the user holds the main body 1 so that the side face he is oriented to the user himself.

On the other hand, in the state where the warning message 25a is displayed as shown in FIG. 11A, if the user touches the NO button 25c on the display panel 2 with the stylus pen 6 (see FIG. 5) (NO decision at S24), the control unit 12 ends the flow without changing but keeping the second display mode of the display panel 2.

Namely, in the flow as shown in FIG. 10, for the sake of switching the second display mode to a display mode other than the second display mode, the control unit 12 does not switch to the display mode other than the second display mode unless the user starts the action of the communication unit 13. In a case where the user does not start the action of the communication unit 13, the control unit 12 keeps the second display mode.

In the flow as shown in FIG. 10, in a case where the user touches the NO button 25c in a state where the warning message 25a as shown in FIG. 11A is displayed on the display panel 2, the display mode of the display panel 2 is kept as the second display mode. Alternatively, the display mode may be switched in accordance with the operation contents of the display-change operation unit 40. Namely, in a case where the user touches the NO button 25c in a state where the warning message 25a is displayed on the display panel 2, the action of the communication unit 5 is still halted. Therefore, irrespective of the posture of the main body 1 with respect to the user, the adverse effect of the electromagnetic wave to the user is not serious. Therefore, for example, in a case where the first operating portion 40a is operated, the display mode of the display panel 2 may be switched from the second display mode to the first display mode.

[2-3. Action Example 3]

FIG. 12 shows a flow as shown in FIG. 8, to which steps S31-S34 are added.

In the flow as shown in FIG. 12, in a case where the display mode other than the second display mode is changed to the second display mode as shown in FIG. 8 and subsequently any one of the first operating portion 40a, the third operating portion 40c and the fourth operating portion 40d is operated (YES decision at S31), the control unit 12 first shifts the communication unit 13 to an actuating state (S32).

Next, the control unit 12 switches the display mode of the display panel 2 to a display mode corresponding to the operation of the first operating portion 40a, the third operating portion 40c or the fourth operating portion 40d (S33).

Next, the control unit 12 allows the display panel 2 to display the message 26a as shown in FIG. 11B (S34).

Namely, the flow as shown in FIG. 12 is characterized in that in a case of shifting to the second display mode and subsequently shifting to a display mode other than the second display mode, the communication unit 13 is shifted to the actuating state and at the same time the message is displayed.

[3. Configuration of a Notebook PC Having a Communication Function]

Though a tablet type PC is described as an example of the information processing unit in the present embodiment, this can be replaced with a notebook PC having a communication function.

FIGS. 13A and 13B are perspective views showing an appearance of a notebook PC. FIG. 13A shows a notebook PC in a first state. FIG. 13B shows a notebook PC in a second state.

As shown in FIG. 13A, the notebook PC includes a first cabinet 101 and a second cabinet 102. The first cabinet 101 contains a circuit board on which various electric elements are packaged, a hard disk drive and the like. The second cabinet 102 includes a liquid crystal display 104. The first cabinet 101 and the second cabinet 102 are supported rotatably to each other by an opening/closing hinge 103. The second cabinet 102 is in a substantially box form having a front face 102a, a lower face 102b, a back face 102g, an upper face 102h, a first side face 102i, and a second side face 102j. The front face 102a and the back face 102g oppose each other in parallel with a predetermined spacing, the upper face 102h and the lower face 102b oppose each other in parallel with a predetermined spacing, and the first side face 102i and the second side face 102j oppose each other in parallel with a predetermined spacing.

Further, by a rotational hinge 107 the second cabinet 102 is supported rotatably to the first cabinet 101. The rotational hinge 107 is contained in a hinge support portion 108. The hinge support portion 108 holds the rotational hinge 107. During an action of opening/closing the second cabinet 102, the hinge support portion 108 rotates integrally with the second cabinet 102. The hinge support portion 108 does not rotate during a rotation of the second cabinet 102. Namely, the second cabinet 102 can rotate independently from the hinge support portion 108.

The opening/closing hinge 103 has a spindle that supports rotatably the first cabinet 101 and the second cabinet 102.

A main plane (hereinafter, referred to as upper face) 101a of the first cabinet 101 includes a keyboard 105 and a pointing device 106. The keyboard 105 accepts operations for inputting various characters by the user. The pointing device 106 is fixed inside the first cabinet 101, and the operation face is exposed on the surface of the upper face 101a of the cabinet 101. The pointing device 106 is a device capable of accepting the contact operation by the user on the operation face and moving a cursor indicated on the liquid crystal display 104 to a desired position.

The upper face 101a of the first cabinet 101 denotes a face that opposes the second cabinet 102 when the notebook PC is in the second state as shown in FIG. 13B. The front face 102a of the second cabinet 102 denotes a face that opposes the first cabinet 101 when the notebook PC is in the second state as shown in FIG. 13B.

In general, for using the notebook PC, the second cabinet 102 is rotated from the second state as shown in FIG. 13B in a direction indicated with an arrow B so as to be shifted to the first state as shown in FIG. 13A. For folding the notebook PC, the second cabinet 102 is rotated from the first state as shown in FIG. 13A in a direction as indicated with an arrow A so as to be shifted to the second state as shown in FIG. 13B. The first state denotes a state where the liquid crystal display 104 can be recognized visually and which is the normal state for using the notebook PC. The second state denotes a state where the second cabinet 102 is folded with respect to the first cabinet 101 and which is an inactive state for carrying the notebook PC for example. In FIG. 13A, the angle formed by the upper face 101a of the first cabinet 101 and the front face 102a of the second cabinet 102 (hereinafter, referred to as opening/closing angle) is set to about 90°. Actually the second cabinet 102 can be rotated to a position with the opening/closing angle of 90° or more. Namely, under some states of use of the notebook PC, since the state with the opening/closing angle of 90° is not always the preferable angle for the user to observe the liquid crystal display 104, it is preferable that the second cabinet 102 can be rotated to a position with the opening/closing angle of 90° or more. Therefore, the "normal state for using the notebook PC" is not limited to the first state with the opening/closing angle of 90° as shown in FIG. 13A, but a state of the opening/closing angle of 90° or more is included.

In the notebook PC according to the present embodiment, the second cabinet 102 can be opened/closed between the first state and the second state, and also the second cabinet 102 can be rotated. Namely, the notebook PC according to the present embodiment can undergo changes to any states other than the first state and the second state.

FIG. 13C is a perspective view showing a notebook PC in a third state. FIG. 13D is a perspective view showing a notebook PC in a fourth state. And FIG. 13E is a perspective view showing a notebook PC in a fifth state.

As shown in FIG. 13C, the third state denotes a state where the second cabinet 102 is rotated by about 90° from the first state as shown in FIG. 13A about the rotational axis C1 in a direction indicated with an arrow C. Further, by being rotated about the rotational axis C1 from the third state in a direction indicated with an arrow D, the second cabinet 102 can be shifted to the first state. Here, the third state is not a state enabling a normal use of the notebook PC, but it is a state in the middle of a shift between the first state and the fourth state.

As shown in FIG. 13D, the fourth state denotes a state where the second cabinet 102 is rotated by about 90° from the third state as shown in FIG. 13C about the rotational axis C1 in a direction indicated with the arrow C. Namely, the fourth state denotes a state where the second cabinet 102 is rotated by about 180° from the first state as shown in FIG. 13A in the direction indicated with the arrow C. The second cabinet 102 can be shifted to the third state by being rotated from the fourth state about the rotational axis C1 in the direction indicated with the arrow D.

As shown in FIG. 13E, a fifth state denotes a state where the second cabinet 102 is rotated by about 90° from the fourth state as shown in FIG. 13D about the opening/closing axis A1 in the direction indicated with the arrow A. The fifth state denotes a state where the back face (the rear side of the face on which the liquid crystal display 104 is disposed) of the second cabinet 102 opposes the upper face 101a of the first cabinet 101. Therefore, in the fifth state, the liquid crystal display 104 can be recognized visually. In the fifth state, the second cabinet 102 is positioned so that the display face of the liquid crystal display 104 is substantially parallel to the upper face 101a of the first cabinet 101. Further, the second cabinet 102 can be shifted from the fifth state to the fourth state by being rotated about the opening/closing axis A1 in a direction indicated with an arrow B.

That is, the second cabinet 102 can be rotated about the opening/closing axis A1 between the first state and the second state, and between the fourth state and the fifth state. And the second cabinet 102 can be rotated about the rotational axis C1 between the first state and the fourth state, undergoing the third state.

Here, the "opening/closing action" denotes an action of rotating at least one of the plural cabinets (the second cabinet in the present embodiment) about an opening/closing axis so as to shift from the first state to a second state, and to shift from the second state to the first state. In the present embodiment, the "opening/closing action" denotes an action of rotating the second cabinet 102 about the opening/closing axis A1 in a direction indicated by the arrow A or B. An "open state" attainable by the opening/closing action denotes a state where the opening/closing angle of the second cabinet 102 with respect to the first cabinet 101 is 90° or more as shown in FIGS. 13B and 13E. A "closed state" attainable by the opening/closing action denotes a state where the opening/closing angle of the second cabinet 102 with respect to the first cabinet 101 is substantially 0° as shown in FIGS. 13A and 13D. Namely, this is a state where the upper face 101a of the first cabinet 101 and the front face 102a of the second cabinet 102 oppose each other in parallel. Since the opening/closing angle of zero or larger than zero but smaller than 90° of the second cabinet 102 with respect to the first cabinet 101 is regarded as inappropriate for a normal use of the notebook PC, it is defined as "opening/closing transitional state" in the present embodiment.

The "rotation action" denotes an action of rotating at least one of the plural cabinets (the second cabinet 102 in the present embodiment) about a rotational axis that is substantially perpendicular to the opening/closing axis. In the present embodiment, the "rotation action" denotes an action of rotating the second cabinet 102 about the rotational axis C1 in a direction indicated with the arrow C or D (mentioned below). Though the present embodiment refers to a configuration allowing an action of opening/closing or rotating the second cabinet 102 with respect to the first cabinet 101, alternatively it is also possible to open/close or rotate the first cabinet 101 with respect to the second cabinet 102.

As shown in FIG. 13A, a communication unit 109 is provided for the second cabinet 102. As the configuration and function of the communication unit 109 are substantially the same as those of the communication unit 5, the explanation will not be repeated. The communication unit 109 is contained in the second cabinet 102, in the vicinity of the side face 102j. When the user sets the notebook PC in the fifth state as shown in FIG. 13E and holds the notebook PC so that the side face 102j is oriented to the user himself, the communication unit 109 will come to the closest position to the user. At this time, if the orientation of the image displayed on the liquid crystal display 104 is erect with respect to the user, the user possibly may keep holding the notebook PC so that the side face 102j is oriented to the user himself. Therefore, in accordance with the flow as illustrated in FIG. 6, a control is conducted so that a warning message (see FIG. 7) is displayed on the liquid crystal display 104 so as to urge the user to halt the action of the communication unit 109, and in a case where the user does not halt the communication unit 109, the direction of the image displayed on the liquid crystal display 104 is changed. Thereby, the user possibly may change the posture of the notebook PC so as to erect the image displayed on the liquid crystal display 104. As a result, by setting the second cabinet 102 in a way in which the side face 102j is separated from the user, the communication unit 109 is separated from the user and thus the adverse effect of the electromagnetic wave on the user can be decreased.

[4. Effect of Embodiments, and Others]

According to the present embodiment, in a case where either the display-rotating button 4 or the display-change operation unit 40 is operated by the user so that the second display mode (the state (b) in FIG. 4) is selected and further either the communication unit 5 or 13 is in an activated state and the user does not halt the action of the communication unit 5, the display mode is shifted to a mode other than the second display mode. Thereby, the user is required to change the posture of the main body 1 in order to erect the display orientation of the image displayed on the display panel 2 with respect to the user himself. Namely, in a case where the image is displayed on the display panel 2 in the second display mode, the user possibly may hold the main body 1 at the posture as shown in FIG. 5 in order to erect the display orientation of the image, and thus the communication unit 5 is located to be the closest to the user himself. Therefore in the present embodiment, in a case where the second display mode is selected, the display orientation of the display panel 2 is set to a display mode other than the second display mode, so that it is possible to urge the user to change the posture of the main body 1.

In the present embodiment, in a case where the second display mode is selected while the communication unit 5 is in an activated state and the action halting of the communication unit 5 is not selected, the display mode is shifted to either the third display mode or the first display mode. Alternatively, it may be shifted to the fourth display mode (the state (d) in FIG. 4). As a result of the shift from the second display mode to the fourth display mode, the image displayed on the display panel 2 is directed diametrically opposite as viewed by the user. For erecting the display orientation of the image, the user is required to hold the main body 1 so that the side face 1c is oriented to the user. At the posture with the side face 1c being oriented to the user, since the side face 1c and the side face 1b (the side face closest to the communication unit 5) oppose each other, the communication unit 5 will be most separated from the user. Therefore, the adverse effect imposed on the user's body by the electromagnetic wave emitted from the communication unit 5 can be minimized.

In the present embodiment, the warning message 2a as shown in FIG. 7 is a message to notice the user that the action of the communication unit 5 has been halted. Alternatively, a message to urge the user to change the orientation of the main body 1 may be applied. For example, it is possible to display a message "Change PC orientation" or the like.

In the present embodiment, the display mode of the display panel 2 can be switched by either the display-rotating button 4 or the display-change operation unit 40. Alternatively, the display mode may be switched by an application program installed in the PC.

In the present embodiment, in a case where the second display mode is selected and the communication unit 5 is in an activated state, a warning message is displayed on the display panel 2. However, the warning to the user is not limited to such a display on the display panel 2. For example, it is also possible to provide the main body 1 with a light-emitting diode so as to illuminate the light-emitting diode at the time of warning, or to employ a vocal warning.

The tablet type PC and the notebook PC in the present embodiment represent an information processing unit. The operation unit 11, the power-supply buttons 3 and 11a, the display-rotating buttons 4 and 11b represent an operation unit. The control unit 12 in the present embodiment represents a control unit. The communication unit 13 in the present embodiment represents a communication unit. The display panel 2, the display unit 14, the display panel 14a and the touch panel 14b represent a display unit. And, the display-rotating buttons 4 and 11b and the display-change operation unit 40 represent a display-change operation unit.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An information processing unit comprising:
   an operation unit that accepts an operation by a user;
   a communication unit that has a capability of wireless information communications;
   a display unit that has a capability of displaying an image; and
   a control unit that controls actions of the communication unit and the display unit on the basis of operation contents accepted by the operation unit,
   wherein the operation unit has a capability of an operation for changing an orientation of an image displayed on the display unit;
   the control unit is capable of changing the orientation of the image displayed on the display unit on the basis of the operation contents accepted by the operation unit, and when the orientation of the image is changed so that the lower side of the image is located close to the communication unit, the control unit allows the display unit to display a message,
   when the orientation of the image is changed so that the lower side of the image is located close to the communication unit, the control unit allows the display unit to display a message to let the user select whether to halt or not the action of the communication unit, and
   when the operation unit accepts an instruction to halt the action of the communication unit, the control unit halts the action of the communication unit.

2. The information processing unit according to claim 1, wherein the operation unit comprises a display-rotation operating portion that has a capability of an operation for setting arbitrarily the orientation of the image displayed on the display unit.

* * * * *